United States Patent
Rogers et al.

(10) Patent No.: US 12,549,415 B2
(45) Date of Patent: Feb. 10, 2026

(54) FOUR WIRE HIGH SPEED COMMUNICATION SYSTEMS

(71) Applicant: Analog Bits, Inc., Sunnyvale, CA (US)

(72) Inventors: Alan C. Rogers, Palo Alto, CA (US); Michael A. Ang, San Francisco, CA (US)

(73) Assignee: Analog Bits, Inc., Sunnyvale, CA (US)

(*) Notice: Subject to any disclaimer, the term of this patent is extended or adjusted under 35 U.S.C. 154(b) by 823 days.

(21) Appl. No.: 17/592,471

(22) Filed: Feb. 3, 2022

(65) Prior Publication Data

US 2023/0246883 A1    Aug. 3, 2023

(51) Int. Cl.
*H04L 25/02*    (2006.01)
*G06F 13/42*    (2006.01)
*H03L 7/08*    (2006.01)
*H04B 3/02*    (2006.01)

(52) U.S. Cl.
CPC ...... *H04L 25/0276* (2013.01); *G06F 13/4282* (2013.01); *H04B 3/02* (2013.01); *G06F 2213/0002* (2013.01); *H03L 7/0807* (2013.01)

(58) Field of Classification Search
CPC .............................. H04L 25/0276; H04B 3/02
See application file for complete search history.

(56) References Cited

U.S. PATENT DOCUMENTS

| | | | |
|---|---|---|---|
| 7,188,263 B1* | 3/2007 | Rubinstein | G06F 1/3209 716/133 |
| 2008/0117994 A1* | 5/2008 | Shetty | H04L 25/45 375/257 |
| 2013/0007489 A1* | 1/2013 | Unnikrishnan | G06F 13/4282 713/320 |
| 2015/0089110 A1* | 3/2015 | Harriman | G06F 13/4027 710/306 |

* cited by examiner

*Primary Examiner* — Gary Mui
*Assistant Examiner* — Yewon Kim
(74) *Attorney, Agent, or Firm* — Russell Krajec; Krajec Patent Offices, LLC

(57) ABSTRACT

A high speed but power-efficient electronic communications protocol may comprise dual simplex links, each operating in a differential high-speed mode and each capable of a low-speed signaling mode. When both links operate in high speed mode, signaling is performed in-band, with signals embedded as metadata attached to transmitted packets. When one of the links is put into a low-power mode, the return-path signaling may be performed on the two wires previously used for high-speed transmissions. One wire may be used for flow control or other signaling, while the other wire may be used for a wake command, which may initiate the low-power mode to be elevated to a high-speed mode. Multiple lanes may be organized to operate in parallel for each link, allowing for a very high speed communications protocol that may be easily switched into and out of a low-power state without additional sideband wiring.

19 Claims, 10 Drawing Sheets

660
DIFFERENTIAL
VOLTAGE-MODE
TRANSMITTER

700
VOLTAGE MODE
DRIVER IN
DIFFERENTIAL
DRIVE MODE

800 VOLTAGE MODE DRIVER IN LOW-POWER MODE

900 VOLTAGE MODE DRIVER IN ELECTRICAL IDLE MODE

FOUR WIRE HIGH SPEED COMMUNICATION SYSTEMS

BACKGROUND

High speed electronic communications are found in many computer devices and in many situations. Some communications protocols use capacitive coupling (sometimes known as AC coupling) to eliminate common mode voltage differences between the transmitter and receiver. Other protocols may use a direct-coupled connection (sometimes known as DC coupling) between the transmitter and receiver.

Some protocols may allow the transmitter and receiver circuits to enter a low-power mode. This can be known as "sleep" mode, and it may consume much less energy than when transmitting or receiving at full speed.

Many such protocols have difficulty changing from a low power or sleep mode to a fully functioning high-speed mode. The difficulty may arise from the time it takes for an ac-coupled system to reestablish common mode voltages, or for the devices to switch into high-speed mode, calibrate or coordinate transmissions using a timing or training data, then begin operations in high speed.

Electronic communication protocols often contain two basic types of information. A data payload may be the information being transmitted, while the signaling information may contain control signaling. The control signaling may coordinate the transmitting and receiving devices. Such signaling may include flow control, retransmit requests, status, control, error, and linkup information.

Some communication protocols may embed some or all signaling in a packet, metadata, or frame wrapper for the data payload. This may be known as "in-band" signaling. In band signaling operates by the transmitter embedding the signaling as part of the high speed bitstream in a packet being transmitted, and the receiver extracting the signaling information from the received packet.

Other communication protocols may operate using out-of-band signaling. Out of band signaling may often be accomplished by either the same set of high speed wires that are operating in a mode distinct from the high speed mission mode, or a set of signaling wires that are constructed in parallel with the main communication wires. Such signaling that operates on separate wires may be known as "side-band" communications, which is a subset of the more general term of out-of-band communications.

SUMMARY

A high speed but power-efficient electronic communications protocol may comprise dual simplex links, each operating in a differential high-speed mode and each capable of a low-speed signaling mode. When both links operate in high speed mode, signaling is performed in-band, with signals embedded as metadata attached to transmitted packets. When one of the links is put into a low-power mode, the return-path signaling may be performed on the two wires previously used for high-speed transmissions. One wire may be used for flow control or other signaling, while the other wire may be used for a wake command, which may initiate the low-power mode to be elevated to a high-speed mode. Multiple lanes may be organized to operate in parallel for each link, allowing for a very high speed communications protocol that may be easily switched into and out of a low-power state without additional sideband wiring.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Dual Simplex Communication Channels

Figure 1:
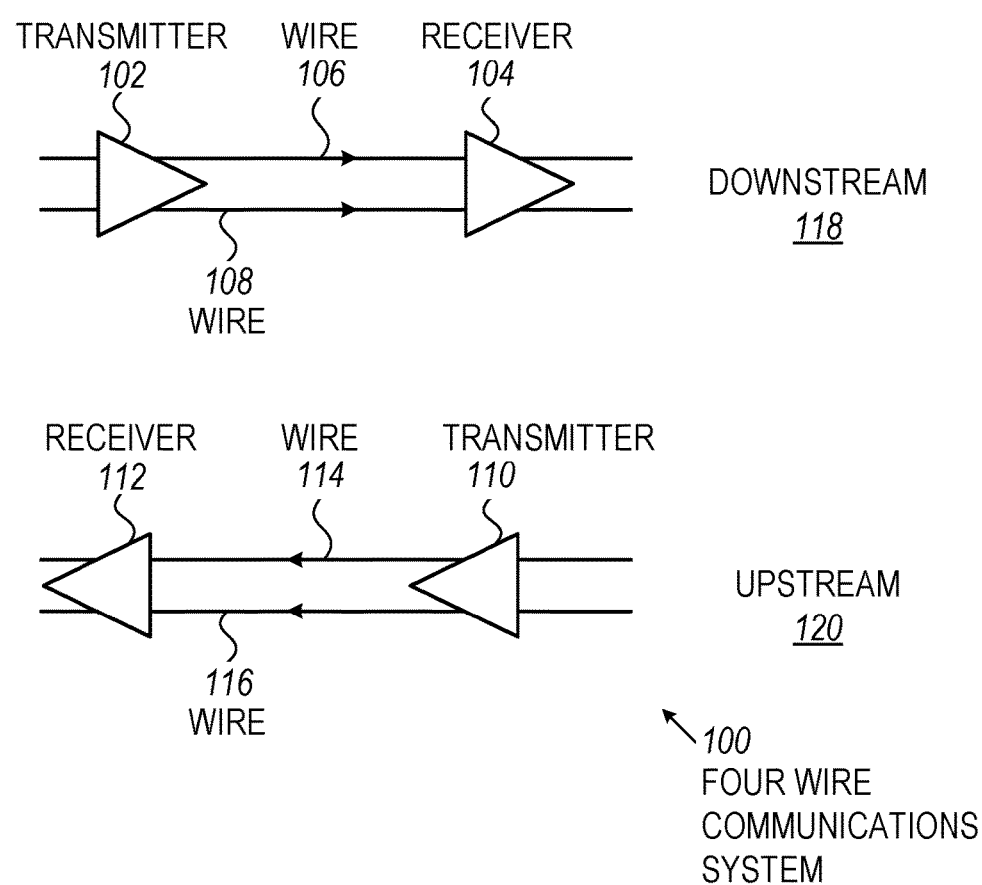
FIG. 1 is a schematic illustration of an embodiment showing a four wire communications system.

A dual simplex, high speed communications protocol may have dual two-wire high speed channels in each direction. When operating in high-speed mode, both channels embed in-band signaling for the opposite-direction communication path. When one of the channels operates in low-power mode, some signaling for the high-speed channel may be transferred to out-of-band signaling using a low-power mode of the opposite-direction path.

The communications protocols may operate each pair of wires in a high-speed mode and also a low-power mode. The same pair of physical wires may be operated in two different manners.

In a high-speed mode, the communications may be packetized data transmission with signaling and other metadata added by the protocol. During high-speed transmissions, the second set of wires may provide reverse-direction signaling, such as flow control, for the first set of wires operating in high-speed mode.

While the first set of wires operates in high-speed mode, the second set of wires may operate in either high-speed mode or a lower-power mode. In high-speed mode, the second set of wires may provide flow control and other signaling for communications occurring on the first set of wires. Such signaling may be embedded in the high-speed operations of the second set of wires. Such signaling may be "in-band" signaling for the first set of wires.

When the second set of wires operates in a lower-power mode and the first set of wires operates in a high-speed mode, the second set of wires may provide "out-of-band" signaling for the first set of wires. In one implementation, a first wire may provide flow control signaling, and the second wire may provide a wake signal.

A wake signal may cause a transmitter and receiver to transition from a lower-power mode to a high-speed mode. In many cases, a wake transition may involve powering up the transmitter and receiver, transmitting a set of training data, and synchronizing various clocks or phase locked loops.

In a typical protocol, a receiver may lock its clock data recovery circuit, then may perform decoding, descrambling, word alignment, SKP processing, and other actions. When ready, the backchannel transmitter may emit a flow control signal that indicates transmission may begin. In many protocols, such a flow control signal may be known as Xon.

During the transition sequence from lower-power mode to high-speed mode, the signaling function of that pair of wires may be inoperable. During such a transition, the flow control signals for the opposite pair of wires may be forced to stop communications, as flow control may not be available during the transition.

In some systems, flow control or other signals may be operable during portions of the transition sequence. For example, some systems may be designed such that a large amount of the transition sequence may occur while continuing to transmit signaling. However, such systems may pause signaling for the opposite direction channel but for a brief period. In such systems, the transition sequence may involve a period during which phase locked loops on the transmitter and receiver side. During such periods, the out-of-band signaling may still occur.

Multiple Lanes of Dual Simplex Communications Channels

The communications protocol may operate with multiple channels operating in either direction. In many use cases, large amounts of data may flow in one direction, with less data flowing in the opposite direction. In such cases, two, three, or more "downstream" channels may be operated in parallel with one, two, or more "upstream" channels.

In some cases, the "upstream" and "downstream" channels may be balanced, with the same number of channels in each direction. In other cases, more channels may be allocated in one direction and fewer in the other.

When multiple lanes may be implemented, one channel may provide reverse-direction signaling for one, two, or more channels. For example, a system may have three "downstream" channels and one "upstream" channel. In such a configuration, the single "upstream" channel may provide all signaling from the first, second, and third "downstream" channels in-band during high-speed mode, or out-of-band during low-power mode. The out-of-band backchannel information from the first, second, and third "downstream" channels can contain signals encoded into a sequence of characters which may be decoded on the receiving end Some implementations may have several parallel channels in one direction, and may permit individual channels to switch from lower-power mode to high-speed mode as additional bandwidth may be requested.

For example, a system with three "downstream" channels may begin operation by transitioning one of the "downstream" channels into high-speed mode. As additional bandwidth may be requested, a second or third "downstream" channels may be added. In such a case, a system may operate with one of the "downstream" channels in a high-speed mode while one or more of the other "downstream" channels may be operated in a lower-power mode.

Such a system may conserve energy consumption by minimizing the number of channels operated in a high-speed mode when not as much bandwidth may be requested.

Throughout this specification and claims, the terms "upstream" and "downstream" are used to designate different directions of communications. The terms "upstream" and "downstream" have no special significance other that to designate a first and second direction of communication. The use of these terms is merely to aid in understanding and describing the communication protocol.

FIG. 1 is a diagram illustration showing an embodiment 100 of a four wire communications system. Embodiment 100 shows a downstream path 118 and an upstream path 120. In the example of embodiment 100, the downstream path 118 and upstream path 120 are identical, but operate in different directions.

The downstream path 118 contains a transmitter 102 and receiver 104, and communications are carried over two wires 106 and 108. Similarly, the upstream path 120 contains a transmitter 110 and receiver 112, carrying communications over wires 114 and 116.

As will be explained in more detail below, each of the downstream path 118 and upstream path 120 may operate in at least a high-speed mode and a low-power mode. In a high-speed mode, high-speed differential communications are carried over a two-wire pair. During high-speed mode, backchannel communications are carried over the opposite path. The backchannel communications may include flow control, linkup status, retry commands, and other commands.

When the downstream path 118 operates in high-speed mode, the upstream path 120 may be in either high-speed mode or low-power mode. When in high-speed mode, the backchannel communications for the downstream path 118 may be embedded into the upstream communications. When in low-speed mode, the backchannel communications for the downstream path 118 may be still be carried on the wires 114 and 116, but in an out-of-band mode. In the low-power mode, circuitry for the high-speed transmitter 110 and receiver 112 may be turned off or otherwise reconfigured to dramatically reduce energy consumption, but may still operate to send low speed backchannel communications to support the high-speed operations on the other path.

The communications system of embodiment 100 illustrates a system where each communication path may change from high-speed to low-power modes independently from the other. For example, the downstream path 118 may change from low-power mode to high-speed mode, while the upstream path 120 may operate in either low-power mode or high-speed mode, and vice versa.

The high-speed modes of the communications paths may use differential signaling. Differential communications can operate at very high speeds and at relatively low voltages, and because the signals can have tight electric and magnetic field coupling, such a communication system reduces the generation of electromagnetic noise. This can be due to the equal and opposite current flow in the two wires that cause cancellation of the electromagnetic fields.

Embodiment 100 may use low voltage differential signaling as the primary example of one use case. However, other communications mechanisms may be used, including current-mode logic, positive emitter coupled logic, or other communications mechanisms.

Embodiment 100 may illustrate a flexible, bi-directional communications system that may use only four physical wires. Many high-speed communications systems use several more sideband wires, as those systems have wires dedicated to out-of-band signaling or other uses.

Embodiment 100 shows a high-speed communications system that may be significantly less costly than other systems that have several more wires. Not only are the costs of the physical wires reduced, the connectors, circuitry, and other components that support the out-of-band signaling may be eliminated.

As will be illustrated later in this specification, the building blocks of embodiment 100 may be expanded by operating several channels in parallel, thereby increasing the communications throughput. Such systems may have extremely high bandwidth with a minimum of cost and complexity.

Figure 2:
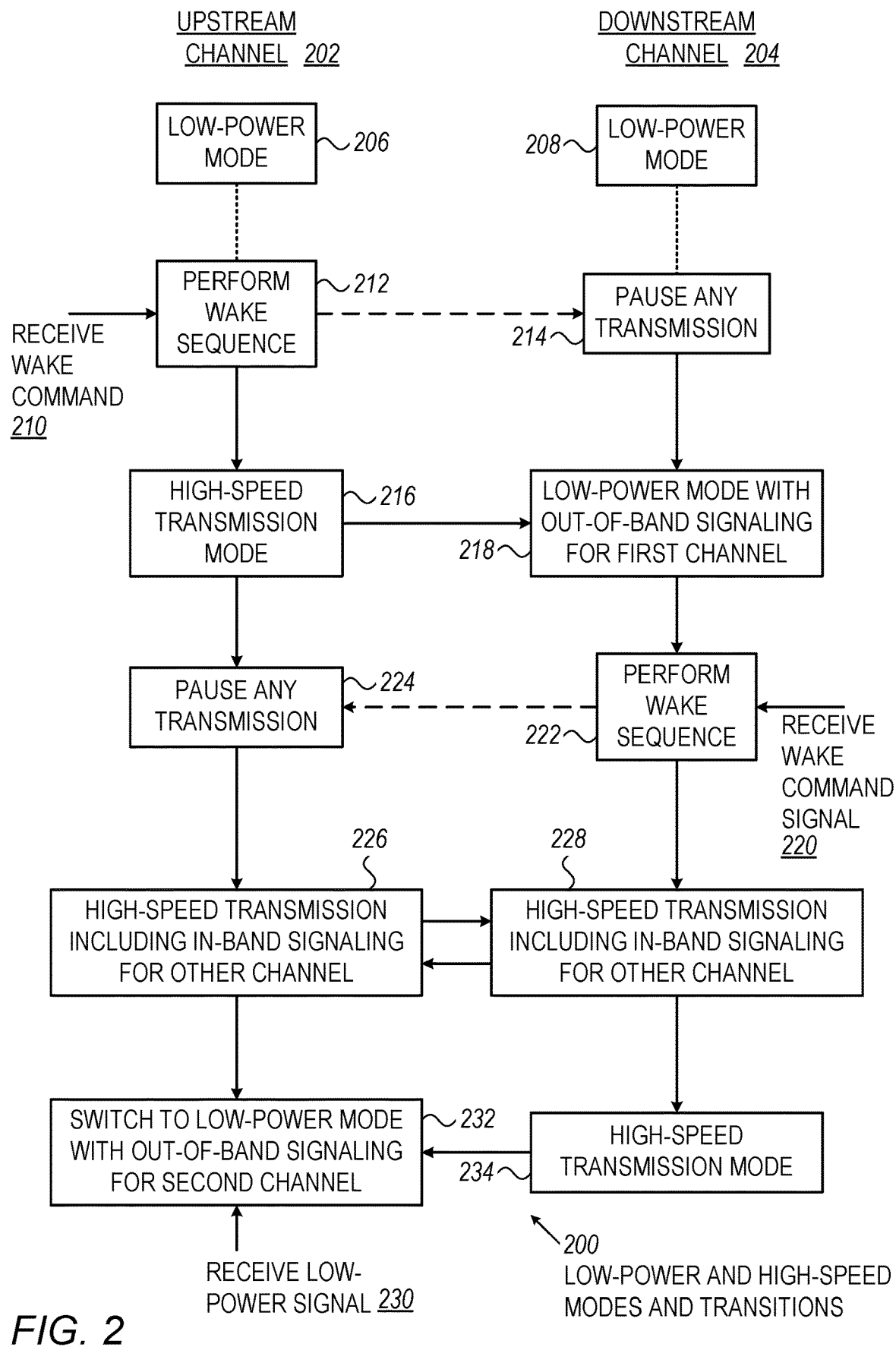
FIG. 2 is a diagram illustration of an embodiment showing a two-channel communications system and independent transitions from low-power to high-speed modes.

FIG. 2 is a diagram illustration of embodiment 200, showing a sequence of operations between an upstream channel 202 and a downstream channel 204. Embodiment 200 may illustrate the transitions from low-power to high-power modes for each channel, as well as the independent transition for each channel.

In blocks 206 and 208, both the upstream channel 202 and the downstream channel 204 may be in a low-power mode. Both channels may be in a low-power mode because the system was just turned on, or when both channels have been powered down.

The upstream channel 202 may receive a wake command 210 and may begin performing a wake sequence 212.

A wake command 210 may be transmitted using an out-of-band communications of the upstream channel's low-power mode. In one configuration, one wire of a two-wire pair may be used for flow control while the other wire may be a wake signal. The flow control logic may be back-channel signaling for a communications channel in the opposite direction, while the wake signal may indicate to the receiver that the transmitter desires to switch to high-speed mode.

A wake signal may be created by controller logic in anticipation of data being received by the transmitter and when the transmitter may be in low-power mode. In low-power mode, the transmitter may not be able to transmit the data, or in some cases, may not be capable of transmitting the data with the speed or bandwidth desired.

The wake signal may initiate a wake sequence. A wake sequence may involve changing the transmitter and receiver's state to a powered-on state. In some cases, high-speed circuitry may be switched into operation.

A wake sequence may involve sending a clocking sequence, training set data, or otherwise synchronizing the transmitter and receiver for communications.

Once the upstream channel 202 has completed the wake sequence in block 212, it may transmit in high-speed communications mode in block 216. While the upstream channel 202 may operate in high-speed mode in block 216, the downstream channel 204 may remain in low-speed mode in block 218. During low-speed mode in block 218, the downstream channel 204 may provide out-of-band signaling for the high-speed mode of the upstream channel 202.

The downstream channel 204 may receive a wake signal 220, which may cause the downstream channel 204 to perform a wake sequence in block 222. During at least a portion of the wake sequence of block 222, the high-speed operation of the upstream channel 202 may be paused in block 224. Because a portion of the wake sequence may cause a channel to interrupt any back-channel signaling for the opposite channel, the opposite channel may pause some or all transmission during the wake sequence, as illustrated by block 224.

The wake sequence of block 222 may be similar to the wake sequence of block 212, when the upstream channel 202 transitioned from low-power mode to high-speed mode. During the transition of block 222, the downstream channel 204 may not be able to provide signaling for the high-speed transmissions of the upstream channel 202, and therefore the upstream channel 202 may enter a momentary pause in block 224.

After successfully transitioning to high-speed mode in block 222, both the upstream and downstream channels 202 and 204 may operate in high-speed mode in blocks 226 and 228.

During high-speed mode of blocks 226 and 228, both channels may provide signaling in the reverse direction using in-band signaling. A typical in-band signaling mechanism may embed or append signaling in packets transmitted along a channel. On the receiving end, the in-band signaling may be extracted from the packets and used to control the flow of the opposite-direction path. In addition to flow control, other commands, statuses, or other communications may be transmitted in this back-channel direction.

The upstream channel 202 may receive a signal to transition to low-power mode 230 while the downstream channel 204 remains in high-speed mode in block 234. When received, the upstream channel 202 may switch to low-power mode in block 232. During low-power mode, signaling for the downstream channel 204 may transition from being in-band signaling to out-of-band signaling. The out-of-band signaling may use the same physical wires previously used for high-speed communications, which carried the in-band signals.

The example of embodiment 200 may illustrate how each channel may separately and independently transition from low-power mode to high-speed mode and back. During low-power mode, signaling for the opposite direction channel may be carried in an out-of-band mode, meaning that the signaling may be carried directly on the physical communication wires of a channel in low-power mode. Those same two wires may be transitioned to high-speed mode when a wake command causes the transmitter and receiver to be switched into the circuit or otherwise enabled for high-speed communications.

Figure 3:
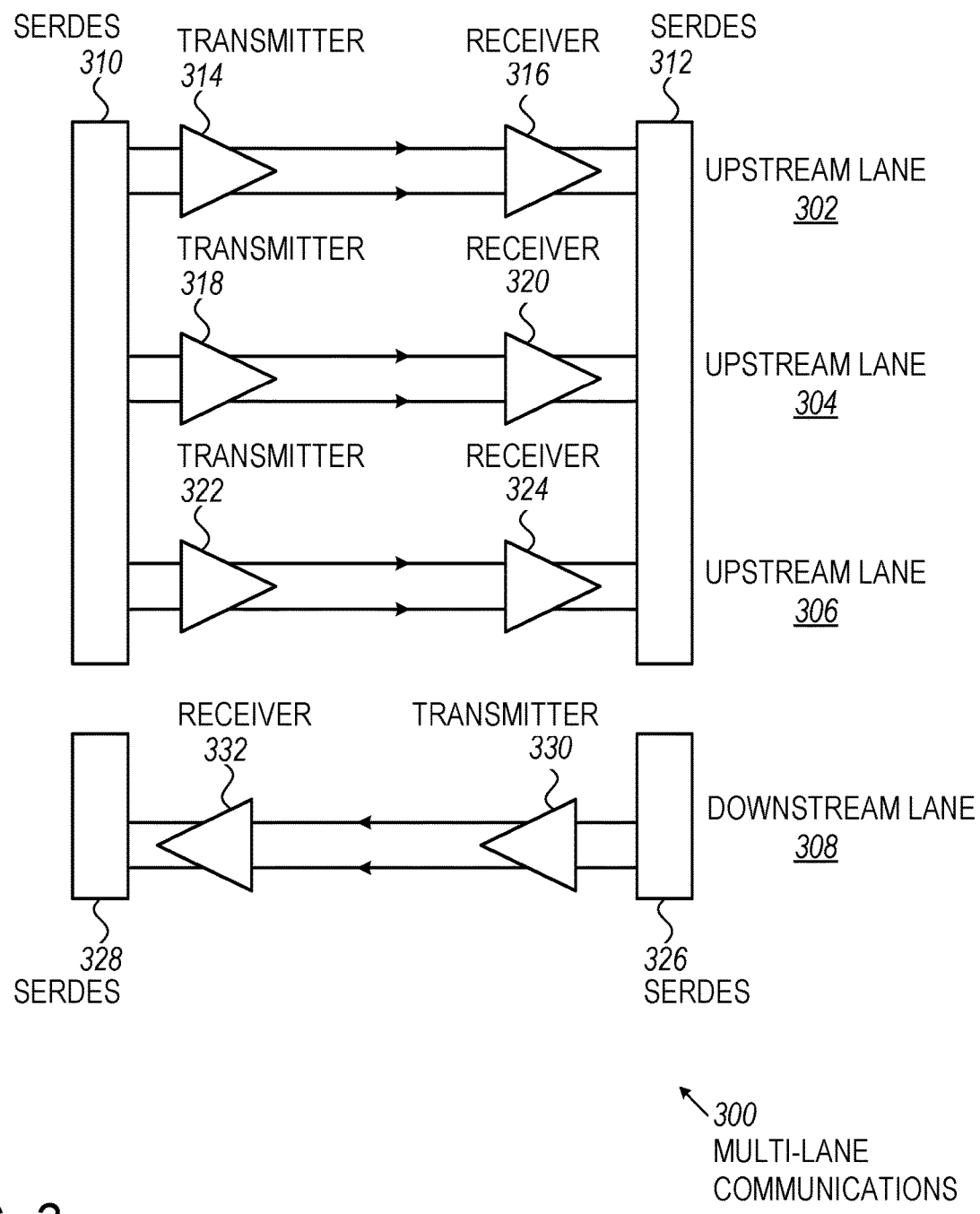
FIG. 3 is a schematic illustration of an embodiment showing a multi-channel communications system with multiple upstream lanes and a single downstream lane.

FIG. 3 is a diagram illustration of an embodiment 300 showing a multi-lane communications system. Embodiment 300 illustrates one example showing three upstream lanes 302, 304, and 306 and one downstream lane 308.

Embodiment 300 is merely one example where multiple lanes of communication may be operated in parallel. Further, embodiment 300 may be an illustration of a system where more lanes operate in one direction than the opposite direction.

The upstream direction may have three lanes of communication, 302, 304, and 306. The upstream channel may have a serializer 310 that may split parallel data into the three serialized lanes. A deserializer 312 may capture the serial data from the three lanes and reestablish the parallel data on the receiving end.

It should be noted that the term "lane" is used in this context to refer to a single set of two-wire communication channels.

Upstream lane 302 may have a transmitter 314 connected to a receiver 316. Upstream lane 304 may have a transmitter 318 and a receiver 320. Upstream lane 306 may have a transmitter 322 and receiver 324. Similarly, the downstream lane 308 may have a transmitter 330 and receiver 322. Each of the lanes may have individual two wire pairs connecting the respective transmitter and receivers.

The operation of the multi-lane communications of embodiment 300 may take different forms. In one form, each of the parallel upstream lanes may have independent signaling. In such a case, upstream lanes 302, 304, and 306 may send flow control and other signaling back through the downstream lane 308. The return signaling along the downstream lane 308 may be coded so that a flow control signal for upstream lane 304 may be routed to transmitter 318's controller, while a flow control signal for upstream lane 306 may be routed to transmitter 322's controller.

In another form of operation, flow control and signaling along the return path of downstream lane 308 may be applied to all transmitters. In such a situation, a single set of signals may be passed along the downstream lane 308, and the signaling may be applied to all of the upstream lanes 302, 304, and 306. In an example of such a situation, a flow control signal passed along the downstream lane 308 may cause all of the upstream lanes 302, 304, and 306 to start or stop transmission as a group. The flow control signaling may be passed along the downstream lane in-band during high-speed operation, or out-of-band on the same set of wires during low-power mode wherein the signals are encoded into a sequence of characters which may be decoded on the receiving end.

The communication system of embodiment 300 is an example of a bi-directional communication system where the same wires can be used in both high-speed and low-power modes. Such a system may eliminate side-band signaling that may use additional wires between a transmitter and receiver pair.

Figure 4:
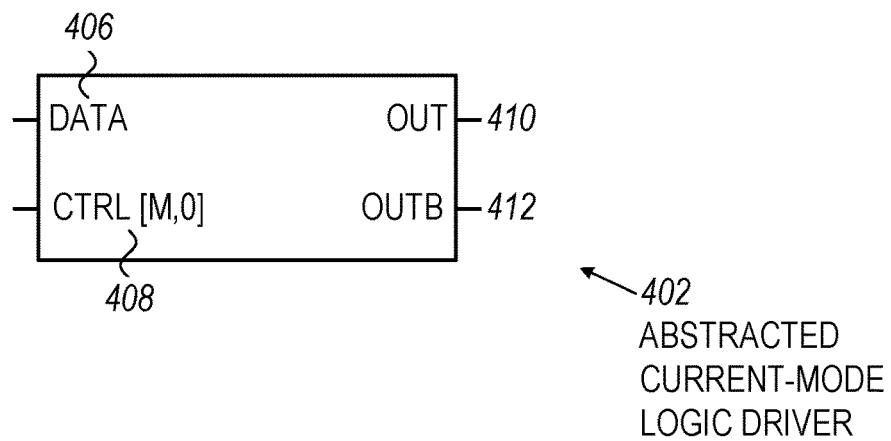
FIG. 4 is a schematic illustration of an embodiment showing a current-mode logic driver on a transmitter side.
Figure 4:
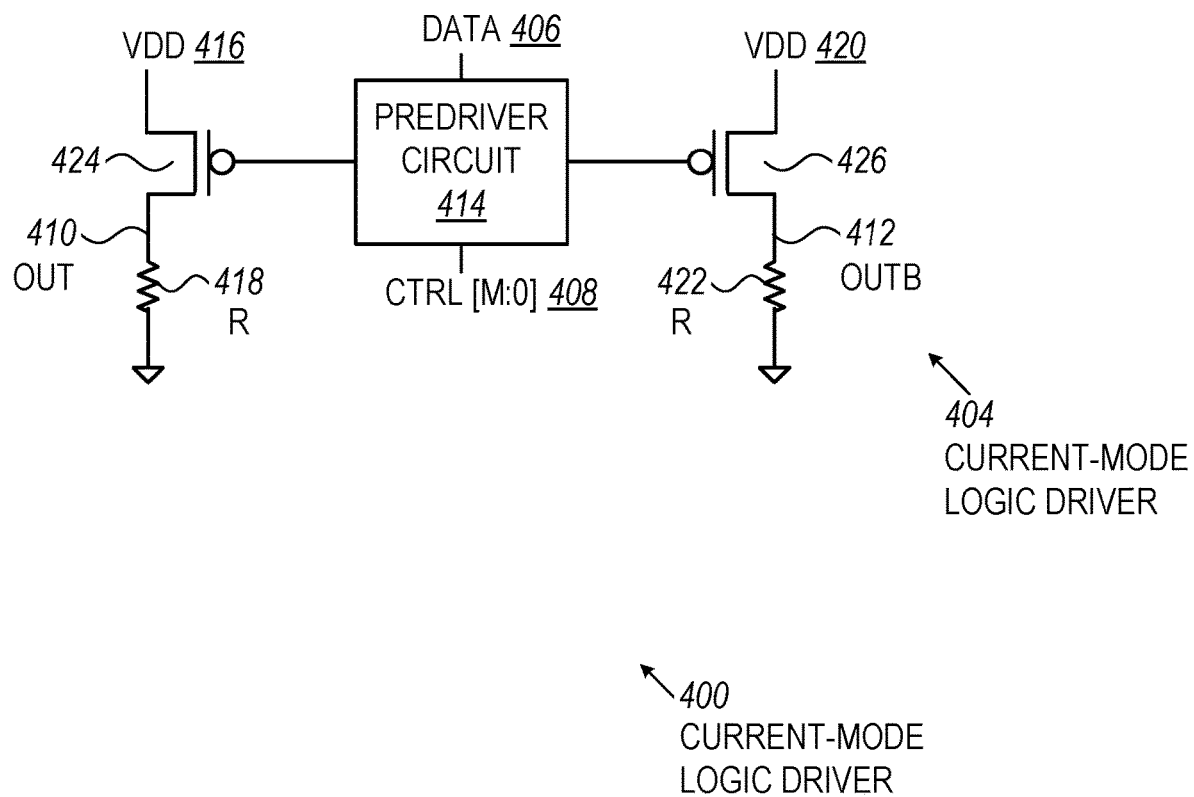

FIG. 4 is a diagram illustration of an embodiment 400 showing a current-mode logic driver. In the diagram, an abstracted current mode logic driver 402 may be illustrated, along with a more detailed schematic of a current mode logic driver 404.

An abstracted current-mode logic driver 402 may include inputs of data 406 and control signals 408. The output may be Out 410 and OutB 412.

The input data 406 may contain the payload to transmit over a two-wire pair, while the control signals 408 configure the operating modes and electrical characteristics of the driver.

Driver electrical characteristics may include parameters such as common mode current, differential current, slew rate, and other parameters. Such signals may be used to configure and control the transmitter to better match the corresponding downstream receiver's input voltage specifications. Driver operating modes may include data transmission mode and electrical idle transmission mode.

Out 410 and OutB 412 may be complementary and opposite signals that may transmit at high speeds along a two-wire communication path. In this example, such a system may be using current-mode circuitry. Another embodiment shown below may illustrate a different system that may use voltage-mode circuitry.

The current-mode logic driver 404 may have inputs of data 406 and control signals 408 into a pre-driver circuit. A current 416 may pass through a CMOS device 424 to create the voltage Out 410 upon passing through a resistor 418 to ground. On the other side, a current 420 may pass through a second CMOS device 426 to create the voltage OutB 412 upon passing through a resistor 412 to ground.

The circuit operates by steering a substantially constant current between two sets of resistive terminators, each of which may represent a differential binary signal. An average voltage between Out 410 and OutB 412 may constitute a common mode voltage, sometimes represented as Vcm. Simultaneously, the voltage between Out 410 and OutB 412 may be a differential mode voltage, Vdiff.

In some embodiments, the various control signals 408 may control parameters such as common mode current, differential current, slew rate, and other parameters.

Figure 5:
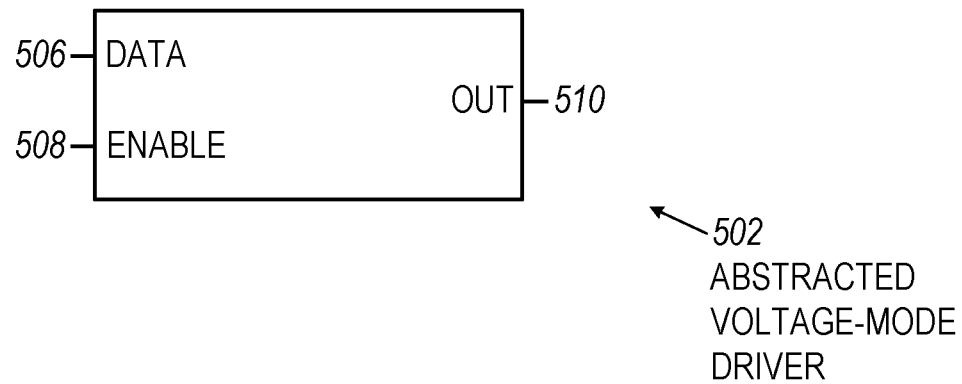
FIG. 5 is a schematic illustration of an embodiment showing a voltage-mode logic driver on a transmitter side.
Figure 5:
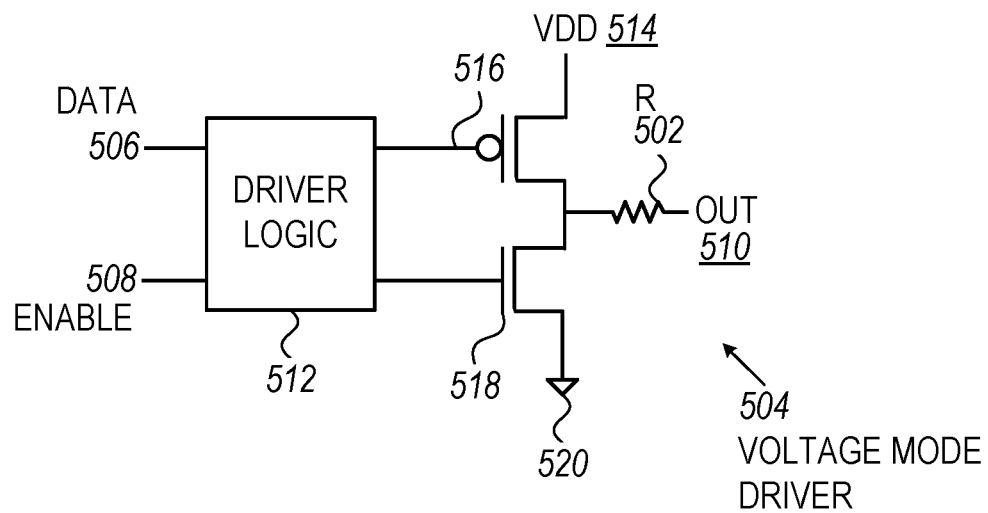

FIG. 5 is a schematic representation of an embodiment 500 showing a single-ended voltage-mode driver module. An abstracted voltage-mode driver 502 and a more detailed voltage-mode driver 504 are illustrated.

In the abstracted voltage-mode driver 502, inputs data 506 and enable 508 are received, while out 510 is output.

In the more detailed voltage-mode driver 504, data 506 and enable 508 pass through a driver logic block 512. Voltage 514 transfers through a first CMOS gate 516 to pass through a resistor 522 to produce a binary-high representation of the signal out 510. Mutually exclusive with the first CMOS gate, a binary-low representation of the signal out 510 is produced when voltage transfers through a second CMOS gate 518 to ground 520.

The voltage-mode driver 504 may operate such that enable 508 may cause the output signal to be pulled up or down at low impedance, or remain at high impedance. The circuit may be configured such that low-impedance drive operation occurs when one of the pull up or pull down transistors are statically active, but not concurrently.

Figure 6:
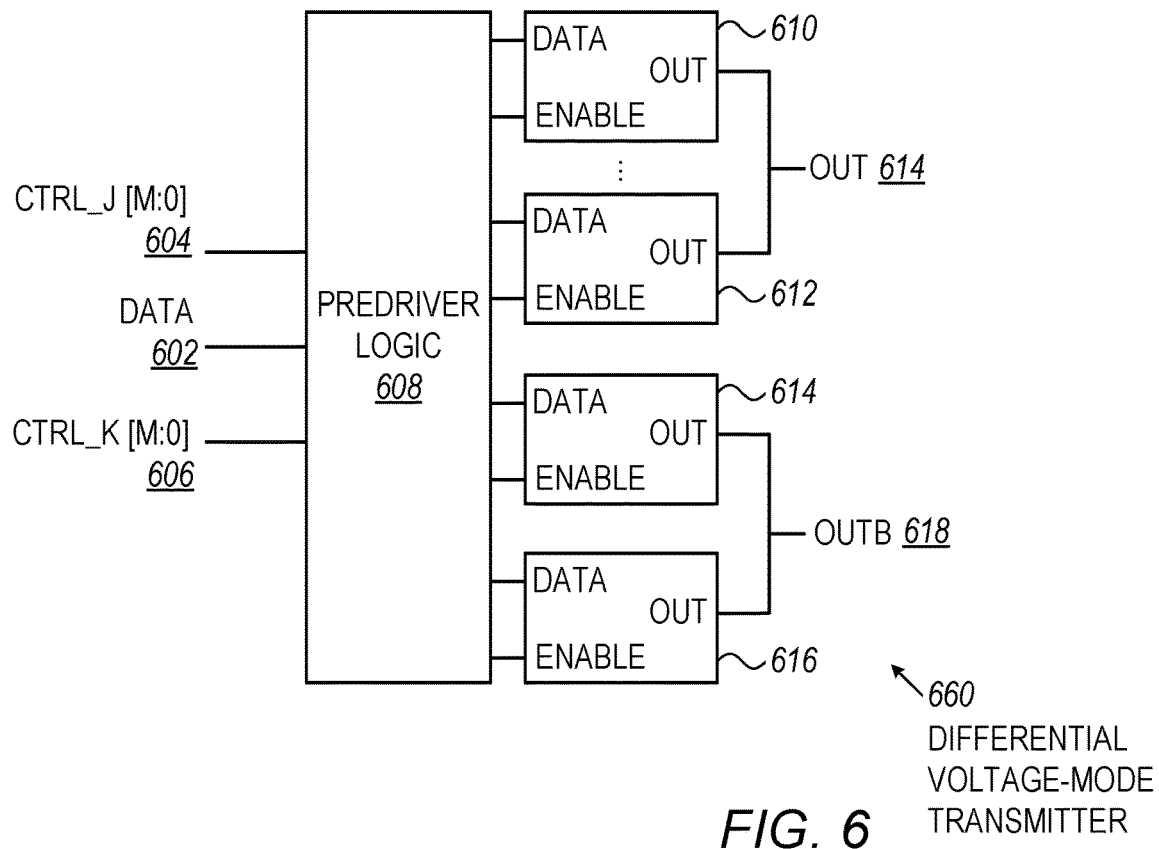
FIG. 6 is a schematic illustration of an embodiment showing a differential voltage-mode transmitter.

FIG. 6 is a schematic representation of an embodiment 600 showing how the single-ended voltage-mode driver modules from embodiment 500 may be arranged into a differential voltage-mode transmitter.

Inputs containing data 602 and CTRL_J 604 and CTRL_K 606 are received by a pre-driver logic block 608. The pre-driver logic block 608 may output Data and Enable signals to several voltage-mode drivers 610, 612, 614, and 616, with several more modules in between represented by dotted lines. In this embodiment, the voltage-mode drivers 610 through 612 may be wired together to produce signal Out 614, while voltage-mode drivers 614 through 616 may be wired together to produce signal OutB 618.

Signals Out 614 and OutB 618 may be complementary and opposite signals. When a positive voltage may be transmitted on Out 614, and equal and opposite voltage may be transmitted on OutB 618. Such a differential signal may communicate using differential voltage.

The CTRL_J 604 and CTRL_K 606 input signals may configure the voltage-mode drivers into different modes. One mode may be a high-speed communication mode, where high output amplitude may actively be transmitted using differential voltage techniques. In such a mode, the high speed differential signal is transmitted on both Out 614 and OutB 616 simultaneously as a difference.

Another mode may be a low-power mode where each of the outputs Out 614 and OutB 618 may be used for independent signaling. In such a mode, each wire may be used for out-of-band signaling for a communications channel, with both wires transmitting in the same direction, as embodiment 600 (not shown).

In a low-power mode, Out 614 and OutB 618 may transmit independent single-ended signals, as opposed to the high-speed mode where both Out 614 and OutB 618 may transmit the same (albeit differential) signal. In low-power mode, one of the wires may transmit flow control or other commands in an out-of-band mode for another communication channel, while the other wire may transmit a wake command or other signals, for example.

In this and other embodiments, flow control signals transmitted during low-power mode may be a simple binary Xon/Xoff control, where the command may be simply the signal state of On/Off of the voltage on a wire.

In other cases, flow control signals may be encoded into a sequence of characters which may be decoded on the receiving end. Such a case may allow for several different commands to be transmitted out-of-band. One use case may be where a single wire may provide out-of-band communications for several communications channels operating in the reverse direction, or when many different commands may be used in the out-of-band signaling.

During high-speed mode, the outputs Out 614 and OutB 618 may provide in-band signaling for control of a different opposite-direction transmitter of embodiment 600 and its receiver counterpart (not shown) as well as low-power out-of-band signaling for a different transmitter/receiver pair (not shown). In the nomenclature of embodiment 100 and assuming embodiment 600 is an example of the transmitter 102, the low-power mode outputs Out 614 and OutB 618 may provide out-of-band signaling for the upstream channel 120, but also high speed signaling for the transmitter 102 and receiver 104. This high speed control signaling for the same-direction link may be referred to as in-band downstream signaling, as distinguished from in-band backchannel high speed control signaling.

In-band downstream signaling may include a powerdown command as well as other commands. A powerdown command may initiate a power off sequence and subsequent transition to a low-speed communication mode. In a simple example, the binary state of Out 614, for example, may be the wake command.

In some embodiments, one of the wires may be dedicated to signaling between the transmitter and receiver. Such signaling may include a wake command, low speed data, or other communications. The opposite wire may be dedicated to handling out-of-band signaling for another channel of opposite-direction communications.

In such embodiments, a low-power flow control wire may contain signals encoded into a sequence of characters which may be decoded on the receiving end. Similarly, a low-power wake wire may likewise contain signals encoded into a sequence of characters that may communicate many different commands, one of which may be a wake command. In some cases, both commands and data payloads may be transmitted at low speeds over a single wire during low-power mode. Such an example may allow small amounts of data to be transmitted without transitioning to high-speed mode. Such a situation may be useful when the data payload may be small and infrequent, for example.

Figure 7:
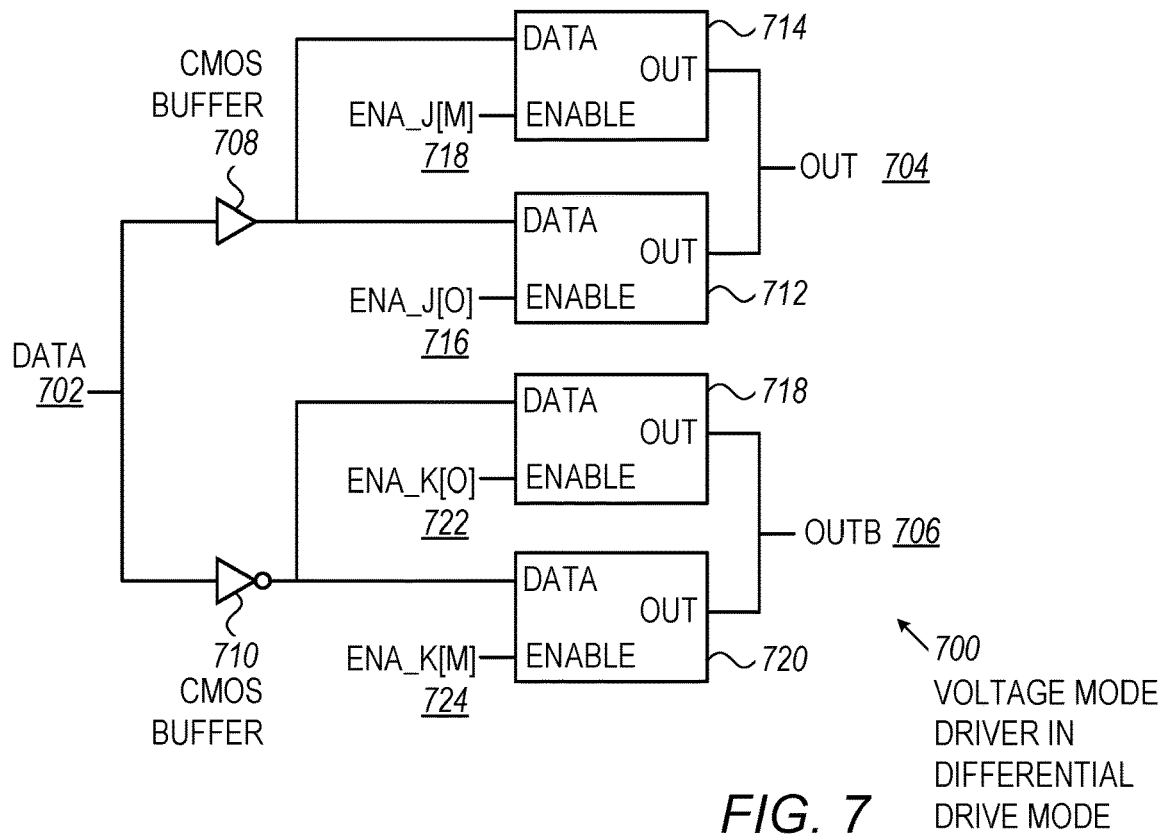
FIG. 7 is a schematic illustration of an embodiment showing a differential voltage-mode transmitter in drive mode or high-speed mode.

FIG. 7 is a schematic illustration of an embodiment 700 showing a more detailed schematic of a voltage-mode transmitter in differential drive mode. The example of embodiment 700 may be a more specific illustration of the generalized illustration of embodiment 600.

Data 702 may be passed through CMOS buffers 708 and 710, where CMOS buffer 710 may create an inverted signal of CMOS buffer 708. The buffered signal from gate 708 may pass through voltage-mode driver modules 712 and 714 to create output signal Out 704. Similarly, the buffered signal from gate 710 may pass through voltage-mode driver modules 718 and 720 to create output signal OutB 706. Signals ENA_J 716 and 718 are inputs to voltage-mode driver modules 712 and 714, respectively. Signals ENA_K 722 and 724 are inputs to voltage-mode drivers 718 and 720, respectively. ENA_J and ENA_K may be internal nodes of the predriver logic 608 of FIG. 6.

Figure 8:
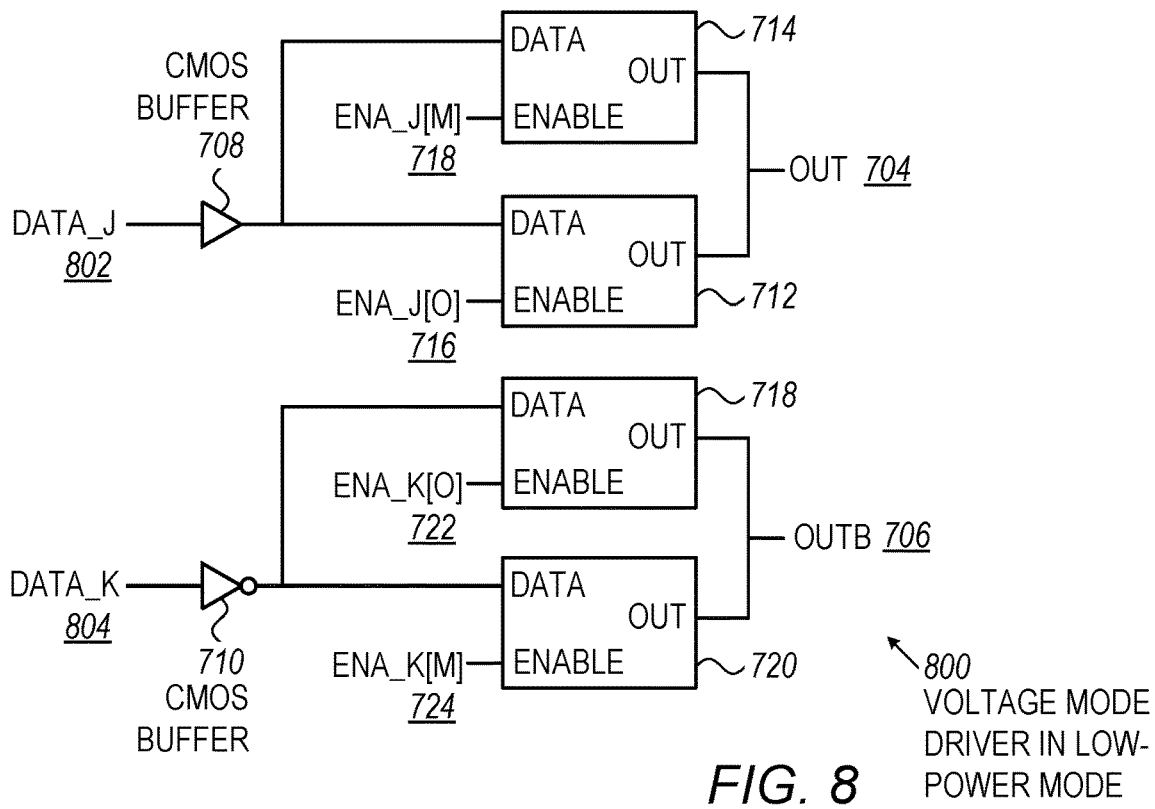
FIG. 8 is a schematic illustration of an embodiment showing a differential voltage-mode transmitter in low-power mode.

FIG. 8 is a schematic diagram of an embodiment 800 showing a voltage mode driver in low-power mode. Embodiment 800 illustrates the circuit of embodiment 700 but where Data_J 802 and Data_K 804 replace the Data 702 input.

In embodiment 700, Data 702 may be a data stream that may be transmitted using differential voltage over Out 704 and OutB 706. In embodiment 800, the same circuitry may be used to transmit one data stream, Data_J 802 on Out 704 and a separate data stream Data_K 804 on OutB 706. In this mode, the data transmitted on Out 704 and OutB 706 are independent.

In one use case, Out 704 may be used for a wake command to cause a transmitter and receiver to change from low-power mode to high-speed mode, while OutB 706 may be used to send signaling for an opposite-direction data stream (not shown).

Data_J 802 may be passed through CMOS buffer 708. The buffered signal from gate 708 may pass through voltage-mode driver modules 712 and 714 to create output signal Out 704. Similarly, Data_K 804 may be passed through CMOS buffer 710 and then through voltage-mode driver modules 718 and 720 to create output signal OutB 706. Signals ENA_J 716 and 718 are inputs to voltage-mode driver modules 712 and 714, respectively. Signals ENA_K 722 and 724 are inputs to voltage-mode drivers 718 and 720, respectively. ENA_J and ENA_K may be internal nodes of the predriver logic 608 of FIG. 6.

Figure 9:
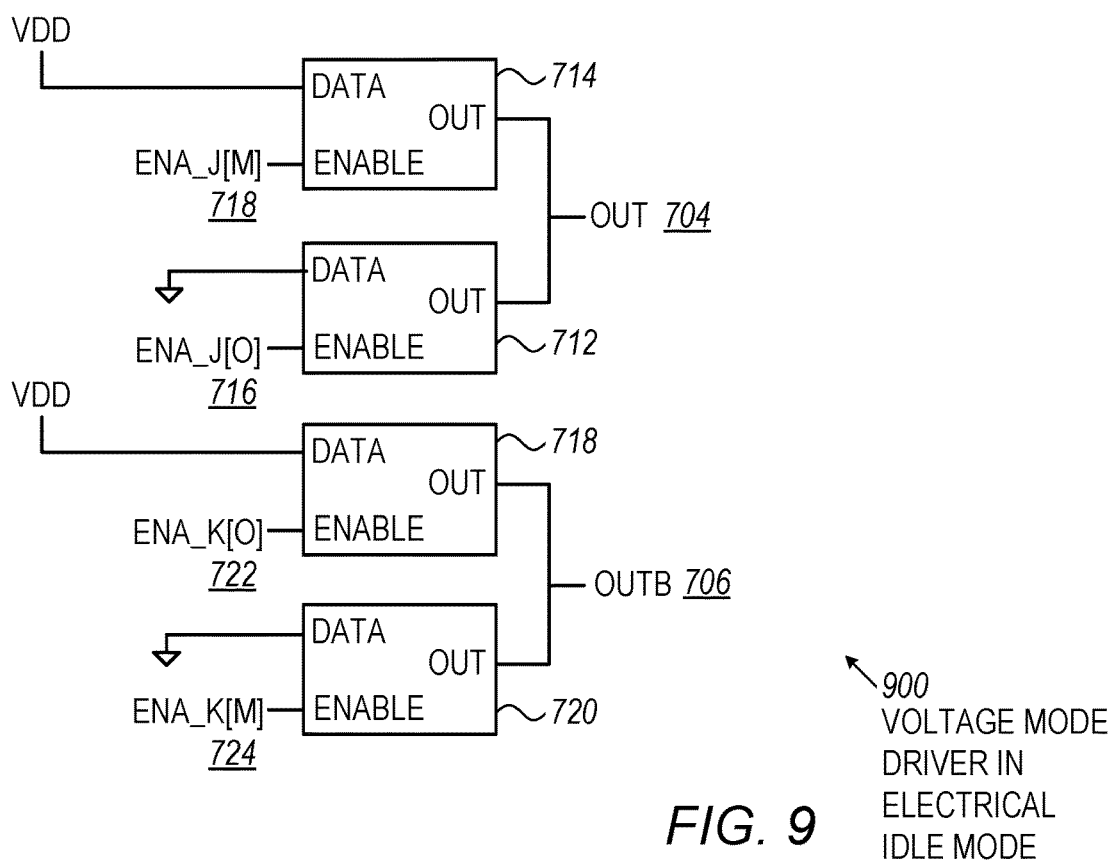
FIG. 9 is a schematic illustration of an embodiment showing a differential voltage-mode transmitter in electrical idle mode.

FIG. 9 is a schematic diagram of an embodiment 900 showing the same voltage-mode transmitter of embodiment 700, but in a legacy electrical idle mode. In ac-coupled protocols with intermediate power-down modes when transmission is halted, electrical idle mode may be employed to maintain the transmitter common mode voltage on the transmitter side of the ac-coupling capacitor. Such an arrangement may allow for faster exit from said legacy power-down mode by preventing the ac-coupling capacitor from discharging, at the expense of high transmitter bias power which may detract from the perceived power-down mode benefits.

Embodiment 900 shows the outputs Out 704 and OutB 706, but with the voltage-mode drivers 714, 716, 718, and 720 configured in electrical idle mode. The impedance controlled voltage-mode driver 712 may be configured with the data signal pulled to ground, while the impedance controlled voltage-mode driver 714 may be configured with the data signal high. Similarly, the impedance controlled voltage-mode driver 716 may be configured with the data signal high, and the impedance controlled voltage-mode driver 718 may be configured with the data signal at ground.

During the state as shown in embodiment 900, the signals ENA_J 716 and 718 may configure the electrical characteristics transmitted on Out 704, and the signals ENA_K 722 and 724 may configure the electrical characteristics on OutB 706.

During electrical idle mode, the differential voltage Vdiff between Out 704 and OutB 706 may be substantially zero volts. In such a configuration, the transmitter may consume at least as much as the mission mode driver bias power.

Embodiments 700 and 800 may represent merely one way to implement a communications system where a wire pair may be operated in a high-speed mode in one instance, then change to a low-power mode in another situation. Such a system may use the same wires in various different modes.

Figure 10:
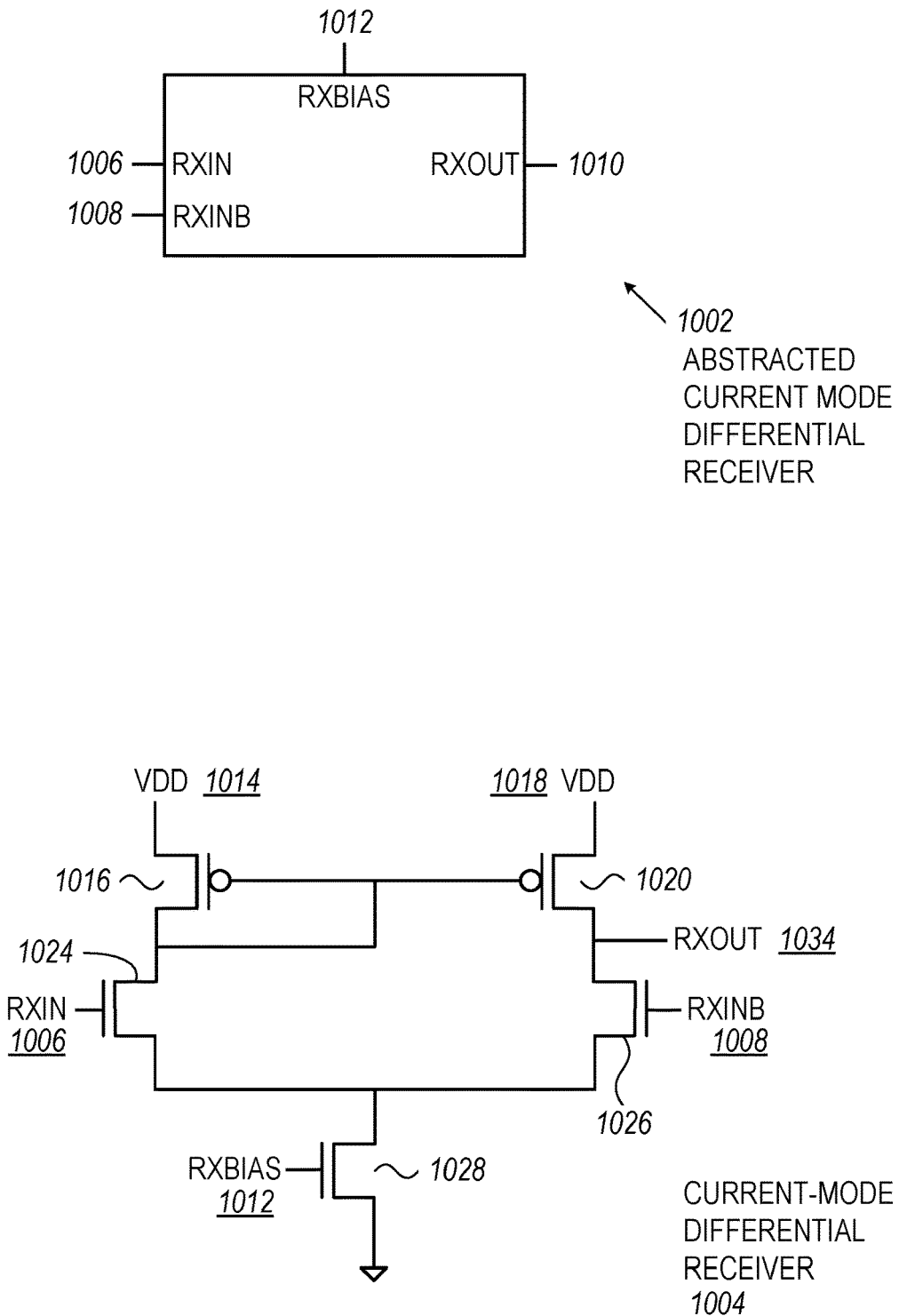
FIG. 10 is a schematic illustration of an embodiment showing a current-mode differential receiver.

FIG. 10 is a schematic illustration of an embodiment 1000 showing a current-mode differential receiver. An abstracted current-mode differential receiver 1002 may be illustrated along with a more detailed current-mode differential receiver 1004.

The abstracted current-mode differential receiver 1002 has inputs RxIn 1006 and RxInB 1008, which produce output RxOut 1010. RxBias 1012 is an input that can bias the inputs 1006 and 1008 to match the receiver common mode voltage to the transmission lines and transmitter. The two output lines from a current-mode or voltage mode differential transmitter may be connected to RxIn 1006 and RxInB 08 via a pair of transmission line wires The current-mode differential receiver 1004 may show RxIn 1006 and RxInB 1008 as well as RxOut 1034. A power source 1014 may pass through a first device 1016 and a second device 1024. The second device 1024 may be configured with the gate attached to RxIn 1006. The circuit may continue to a third device 1022 controlled by RxBias 1012 and ground. A second path may begin with a power source 1018, through a device 1020 to create RxOut 1034. The path may pass through a device controlled by RxInB 1008, which connects to the device 1028 controlled by RxBias 1012. The devices 1016 and 1020 are controlled by the signal between devices 1016 and 1024.

Figure 11:
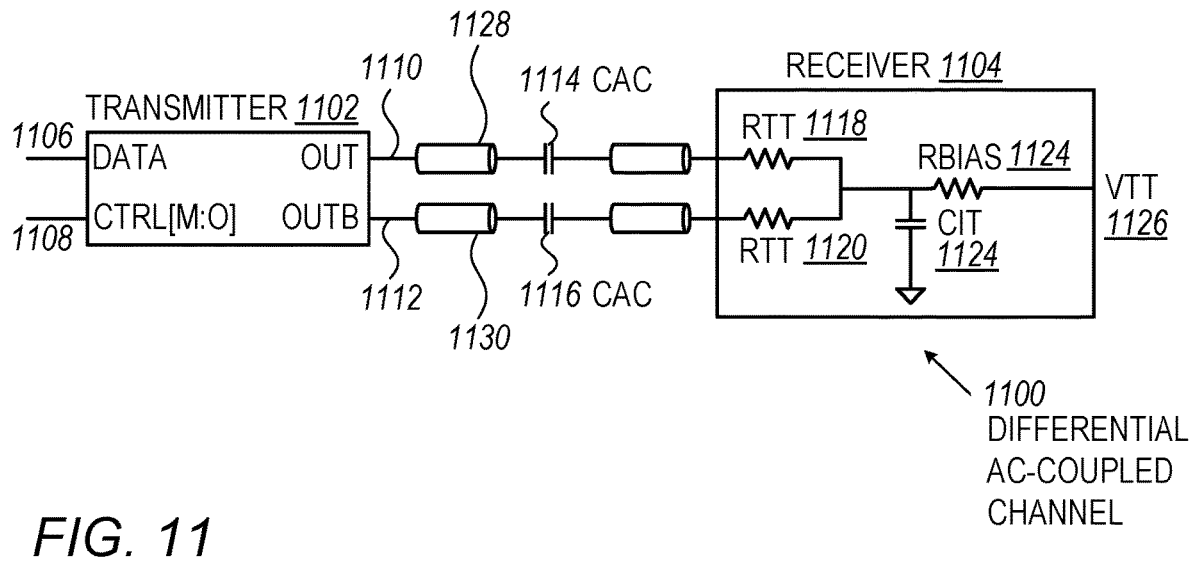
FIG. 11 is a schematic illustration of an embodiment showing a differential AC-coupled channel.

FIG. 11 is a diagram example of an embodiment 1100 showing a differential AC-coupled channel. The channel includes a transmitter 1102 and receiver 1104.

The transmitter 1102 may take as inputs data 1106 and control 1108, and may transmit Out 1111 and OutB 1112. The wires 1128 and 1130 may be the transmission wires, which may include capacitors 1114 and 1116. The capacitors 1114 and 1116 may block the dc Vcm difference between the transmitter and the receiver.

The receiver 1104 may have termination resistors 1118 and 1120 on the respective input signals, whose local receiver-side common mode voltage may be determined by common mode termination voltage Vtt 1126 through the bias resistor 1122. A capacitor 1124 may act as an additional noise filter and common mode return loss mitigator. It should be noted that the termination resistor network of the receiver may merely represent the equivalent Thevenin resistance of a more sophisticated and complicated underlying circuit. Inputs 1006 and 1008 of receiver circuit 1026 connect to the transmission lines in shunt with the termination resistors 1118 and 1120 to resolve the received data RxOut 1022 of embodiment 1000.

AC-coupled transmission systems can be driven by a current-mode or voltage-mode transmitter. The values of the ac coupling capacitors 1114 and 1116, along with the output impedance of transmitter 1102 and the input impedance and the receiver module 1104 form an RC time constant. Below a certain low-frequency limit formed by a multiple of the RC time constant, the signal amplitude decays. To avoid degrading the differential signal voltage, many AC-coupled protocols impose a minimum capacitate as well as a maximum Continuous Identical Digits (CID) limitation in the protocol's bitstream.

Figure 12:
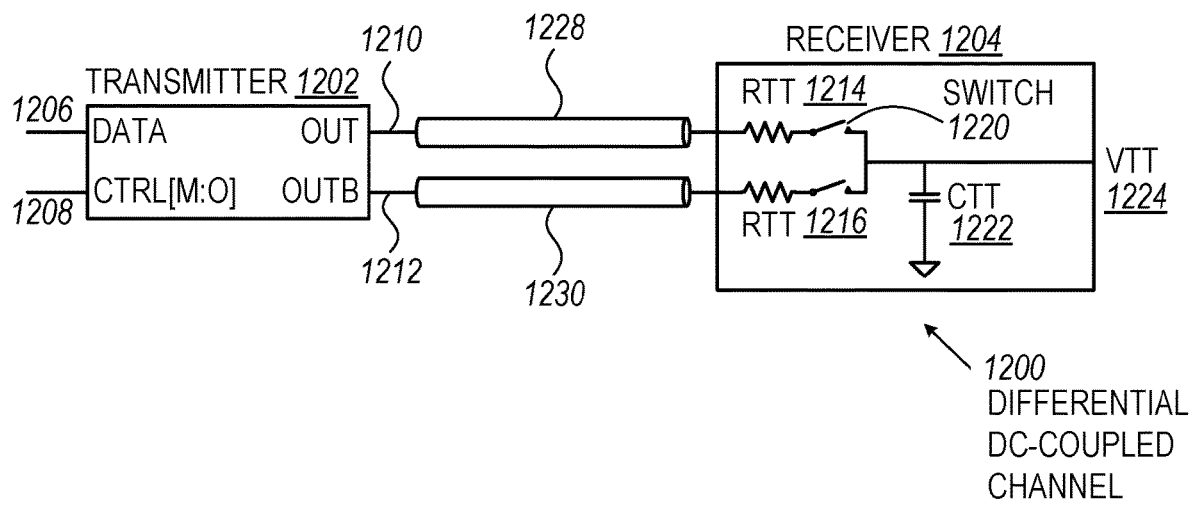
FIG. 12 is a schematic illustration of an embodiment showing a differential DC-coupled channel.

FIG. 12 is a diagram example of an embodiment 1200 showing a differential DC-coupled channel. The channel includes a transmitter 1202 and receiver 1204.

The transmitter 1202 may take as inputs data 1206 and control 1208, and may transmit Out 1210 and OutB 1212. The wires 1228 and 1230 may carry the signals to the receiver 1204, and are devoid of ac-coupling capacitors 1114 and 1116 of embodiment 1100, thus obviating the need for the electrical idle mode of embodiment 900 and its high bias current dissipation, while exhibiting minimal power-down exit latency since there is no common mode voltage to bias across accoupling capacitors.

The receiver 1204 may have termination resistors 1214 and 1216, and may include a switch 1220. A common mode return loss mitigating capacitor 1222 may connect the signals to common mode termination voltage Vtt 1224.

The switch 1220 may be one mechanism by which the receiver 1104 may be changed from high-speed mode to a low-power mode. The receiver power may be disabled by grounding RxBias 1012 of device 1022 of embodiment 1000.

Figure 13:
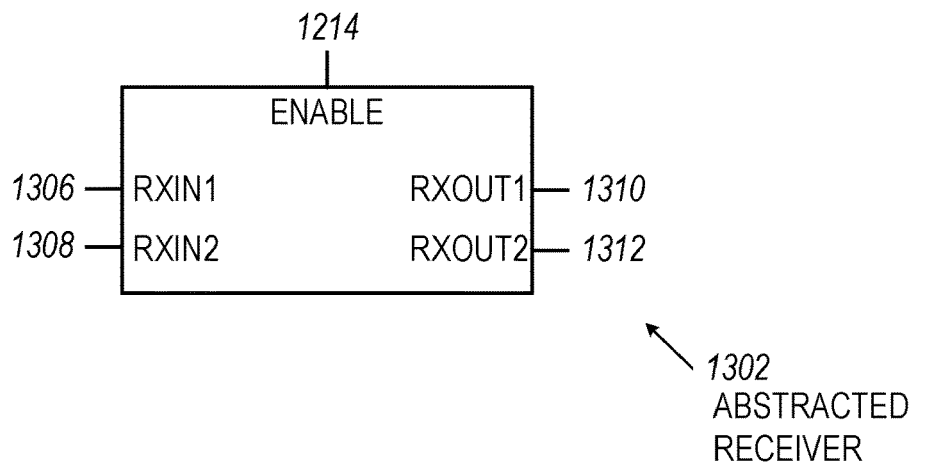
FIG. 13 is a schematic illustration of an embodiment showing dual low power CMOS receivers.
Figure 13:
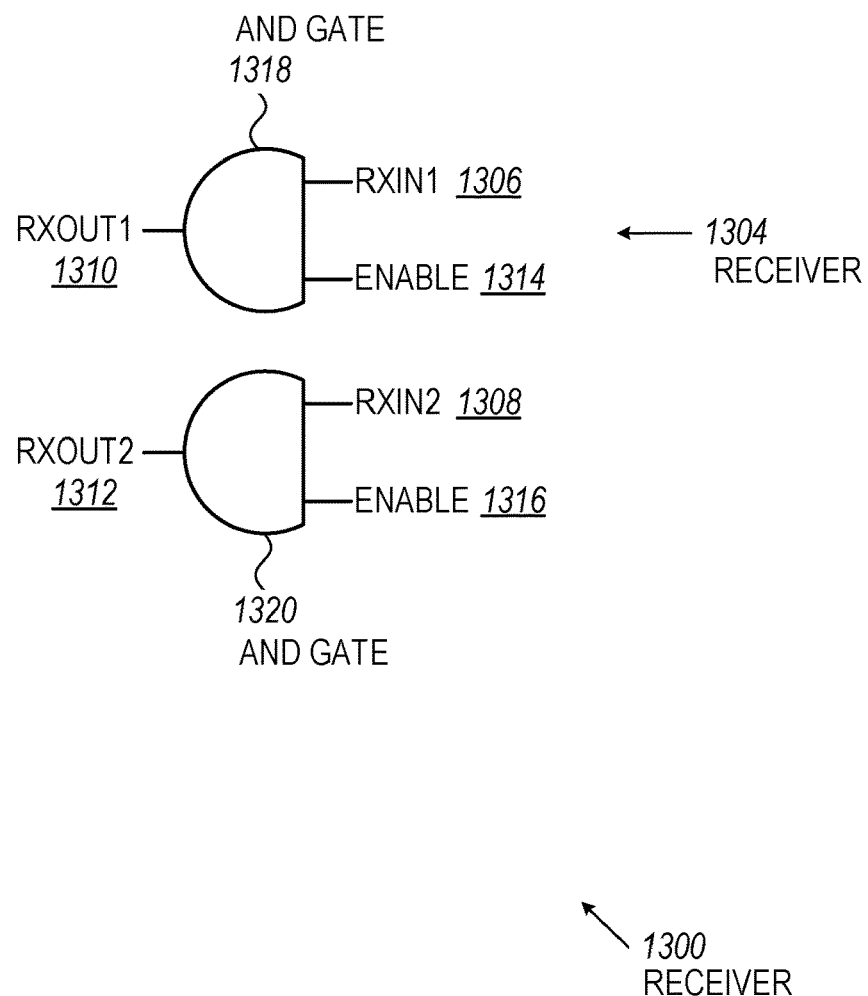

FIG. 13 is a diagram illustration of an embodiment 1300 showing an abstracted receiver 1302 and a more detailed logic of a receiver 1304.

In the abstracted receiver 1302, inputs RxIn 1306 and RxInB 1308 are received to generate RxOut1 1310 and RxOut2 1313. An enable input 1314 may switch the low-power CMOS receiver from a low-power functional mode to a disabled mode.

In many cases, the enable input 1314 may disable high speed receivers, which may consume high amounts of energy, and place those receivers into low-power unbiased state. The disconnection may route signals received on the RxIn1 1306 and RxIn2 1308 into logic that may capture and respond to the low-power signals transmitted during low-power operation.

The logic of the receiver 1304 may show RxIn1 1306 and RxIn2 1308, each of which proceeds to logical AND gates 1318 and 1320, which may be controlled by the enable signals 1314 and 1316.

The enable signals 1314 and 1316 may control whether the RxIn1 1306 and RxIn2 1308 signals are output or quiesce at logic "0". The RxIn1 1306 and RxIn2 1308 signals share the same input connections as the high-speed receiver when in high-speed mode, but each of their outputs are routed to logic circuitry for selection during their respective operational modes.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

The invention claimed is:

1. A differential communications system comprising:
   a first two-wire communications path operable in a first high-speed mode and a first lower-power signaling mode;
   a second two-wire communications path operable in a second high-speed mode and a second lower-power signaling mode;
   said first high-speed mode comprising differential communications across a first set of two wires and operating a protocol comprising in-band signaling for said second two-wire communications path;
   said second high-speed mode comprising differential communications across a second set of two wires and operating a protocol comprising in-band signaling for said first two-wire communications path;

said first lower-power signaling mode carrying flow control signals for said second two-wire communications path;

said second lower-power signaling mode carrying flow control signals for said first two-wire communications path; and said first two-wire communications path and said second two-wire communications path being operable where one of said first or second two-wire communications paths operate in said high-speed mode while the other of said first or second two-wire communications paths operate in said lower-power signaling mode.

2. The differential communications system of claim 1, said first lower-power signaling mode comprising flow control and wake signaling.

3. The differential communications system of claim 1, said first high-speed mode being a dc-coupled high-speed mode.

4. The differential communications system of claim 3, said first and second two-wire communications paths not comprising a coupling capacitor between a first and second transmission wire.

5. The differential communications system of claim 1 further comprising:

a wake signal being transmitted by a first transmitter and received by a first receiver, such that when said wake signal is received, said first transmitter and said first receiver transition to said high-speed mode.

6. The differential communications system of claim 5, said transition comprising locking a phase locked loop circuit and transmitting a training dataset from said first transmitter to said first receiver.

7. The differential communications system of claim 6, said transition further comprising locking a clock and data recovery circuit using said training dataset.

8. The differential communications system of claim 7, said transition further comprising the continued operation of said first low-power flow control signaling during the phase locked loop lock time prior to transmission of a training dataset.

9. The differential communications system of claim 1, said in-band signaling of said first high-speed mode comprising flow control signals.

10. The differential communications system of claim 9, said in-band signaling comprising a power-down command.

11. The differential communications system of claim 10, said power-down command causing a receiver to enter said lower-power signaling mode.

12. The differential communications system of claim 1, said first low-power mode comprising a first wire operable to send a-said wake signal.

13. The differential communications system of claim 12, said low-power mode of said first lower-power signaling mode comprising a second wire operable to send out-of-band signals.

14. The differential communications system of claim 13 where the out-of-band signals comprise flow control, retransmit, status, control, error, and linkup information.

15. The differential communications system of claim 13, said in-band signaling of said first high-speed mode comprising flow control, retransmit, status, control, error, and linkup information.

16. The differential communications system of claim 12, a flow control signal comprising Xon/Xoff binary signal levels.

17. The differential communications system of claim 1 further comprising a serdes converter.

18. The differential communications system of claim 17 configured such that said first and second two-wire communications paths operate in said first and second high-speed mode, respectively, while a third two-wire communications path operates in said a third lower-power signaling mode, said third lower-power signaling mode comprising signaling for both of said first and second high-speed modes.

19. The differential communications system of claim 1 further comprising a third two-wire communications path operable in a third high-speed mode and a third lower-power signaling mode.

* * * * *